United States Patent [19]

Ikeuchi et al.

[11] Patent Number: 5,738,701
[45] Date of Patent: Apr. 14, 1998

[54] GLASS GOB PRODUCTION DEVICE AND PRODUCTION METHOD

[75] Inventors: Osamu Ikeuchi, Kawanishi; Naoko Yamada, Funabashi; Toshiya Tomisaka, Yao; Takeshi Yamashita, Kawanishi; Futoshi Ishida, Takatsuki, all of Japan

[73] Assignee: Minolta Co., Ltd., Osaka, Japan

[21] Appl. No.: 626,344

[22] Filed: Apr. 2, 1996

[30] Foreign Application Priority Data

Apr. 5, 1995 [JP] Japan ............... 7-080210
Apr. 6, 1995 [JP] Japan ............... 7-081131

[51] Int. Cl.⁶ .................................... C03B 5/24
[52] U.S. Cl. ............... 65/29.12; 65/29.18; 65/29.21; 65/127; 65/128; 65/133; 65/162; 65/164; 65/223; 65/304; 65/327
[58] Field of Search .......................... 65/29.12, 29.18, 65/29.21, 127, 128, 133, 162, 163, 164, 223, 226, 304, 327

[56] References Cited

U.S. PATENT DOCUMENTS

| | | | |
|---|---|---|---|
| Re. 30,998 | 7/1982 | Peters | 65/163 |
| 1,143,317 | 6/1915 | Proeger | 65/127 |
| 1,353,907 | 9/1920 | Graham | 65/127 |
| 1,711,818 | 5/1929 | Stuckey | 65/127 |
| 1,853,002 | 4/1932 | Howard | 65/127 |
| 1,961,015 | 1/1934 | Stewart | 65/127 |
| 2,730,560 | 1/1956 | Hage | 65/29.21 X |
| 2,994,161 | 8/1961 | Bair | 65/127 |
| 3,271,126 | 9/1966 | Jenkins | 65/128 |
| 3,817,736 | 6/1974 | Kojo et al. | 65/127 X |
| 3,988,139 | 10/1976 | Goodwin | 65/162 |
| 4,205,973 | 6/1980 | Ryan | 65/29.18 X |
| 4,592,770 | 6/1986 | Pearman et al. | 65/128 |
| 4,604,122 | 8/1986 | Keller | 65/29.18 |

FOREIGN PATENT DOCUMENTS

| | | |
|---|---|---|
| 62-216925 | 9/1987 | Japan . |
| 2-34525 | 2/1990 | Japan . |
| 5-85743 A | 4/1993 | Japan . |
| 5-147949 | 6/1993 | Japan . |
| 5-40693 | 6/1993 | Japan . |

Primary Examiner—Donald E. Czaja
Assistant Examiner—Sean Vincent
Attorney, Agent, or Firm—Burns, Doane, Swecker & Mathis, LLP

[57] ABSTRACT

A glass gob production device for producing a glass gob from molten glass. The glass gob production device has a crucible which accommodates molten glass, a nozzle one end of which is connected to the crucible and from the other end of which the molten glass in the crucible is discharged, and a support member opposite to the other end of nozzle and having an indentation on the surface thereof for receiving and retaining the discharged molten glass in the indentation to form a glass gob. The indentation of the support member has a bottom surface and a reference surface extending in a direction perpendicular to the circumference of the bottom surface.

21 Claims, 7 Drawing Sheets

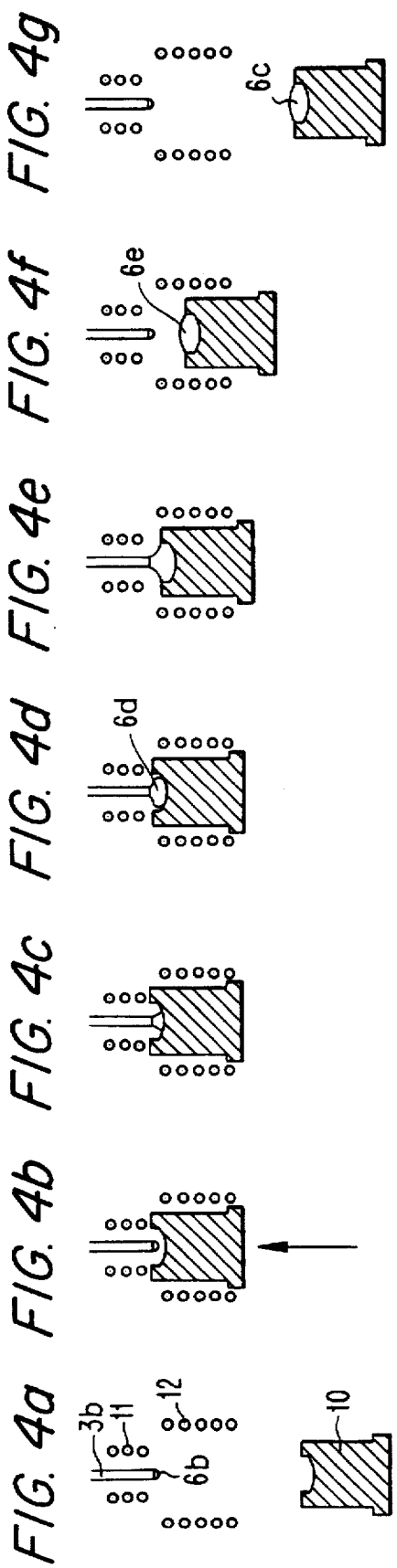
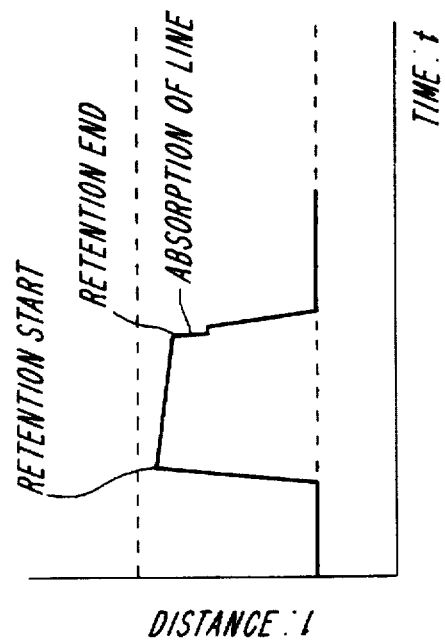
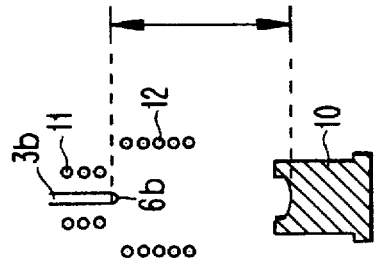

FIG. 6a
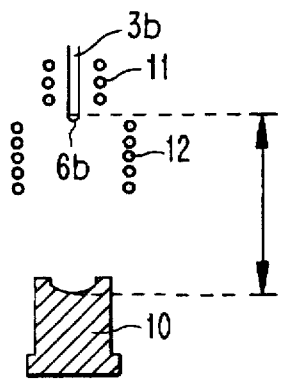
FIG. 6b
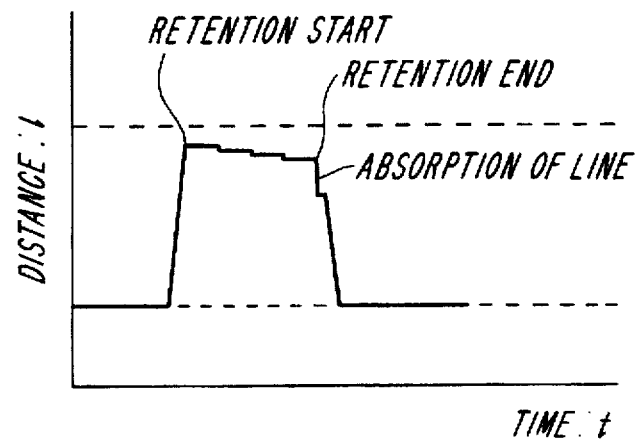
FIG. 7a
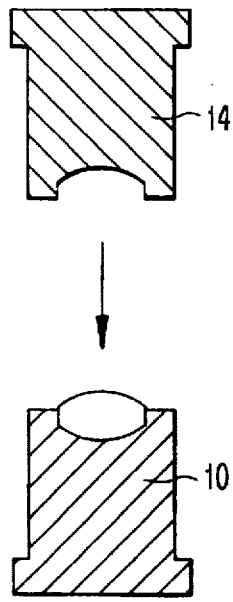
FIG. 7b
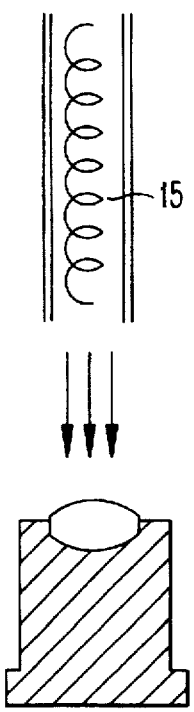
FIG. 7c

GLASS GOB PRODUCTION DEVICE AND PRODUCTION METHOD

BACKGROUND OF THE INVENTION

1. Field of the Invention

The present invention relates to a glass gob production device and production method, and more specifically relates to a glass gob production device and production method using gravity drop of glass droplets.

2. Description of the Related Art

Glass gobs are conventionally produced by well known non-abrasion glass gob production methods by dropping a molten glass flow from a molten glass tank through a discharge pipe into a molding tool, separating the molten glass flow and the molten glass remaining in the molding tool by high-speed dropping of the molding tool, and cooling the separated molten glass to produce a glass gob. Glass gobs produced in this manner are placed in a press tool and heated, and subsequently subjected to press molding to produce a lens without defects such as surface marks and greying, without grinding.

In the aforesaid method, however, problems arise with the positioning and stability of the glass gob placed in the press tool because the formed glass gob has a spherical lens shape or aspherical lens shape. When the glass gob is not placed precisely and stably in the press tool, the surface of the formed lens is subject to astigmatism and distortion, which prevents the lens from being used as a product.

In conventional non-abrasive glass gob production method, the type of usable glass is limited by conditions such as melt temperature, viscosity, liquid-phase temperature (upper limit of the temperature range at which crystals form in the glass). Accordingly, the glasses mainly used in the aforesaid production methods have low devitrification (the characteristic of loss of transparency due to the formation of crystals in the glass) and high viscosity, and glasses having high devitrification and low viscosity cannot be used.

SUMMARY OF THE INVENTION

A main object of the present invention is to provide a device and method for producing defectless non-abrasive glass gobs.

Another object of the present invention is to provide a non-abrasive glass gob production device and method which does not limit the types of usable glass.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 4(a), 4(b), 4(c), 4(d), 4(e), 4(f) and illustrates the glass gob production process of the device of FIG. 1;

FIG. 5(a) shows the distance between the support member and the nozzle tip in the glass gob production method as a first embodiment according to the present invention;

FIG. 5(b) shows the operation and distance between the support member and the nozzle tip in the various processes of the glass gob production method as the first embodiment according to the present invention;

FIG. 6(a) shows the distance between the support member and the nozzle tip in the glass gob production method as the second embodiment according to the present invention;

FIG. 6(b) shows the operation and distance between the support member and the nozzle tip in the various processes of the glass gob production method as the second embodiment according to the present invention;

FIG. 7(a) shows the state wherein sink marks form in the center of the glass gob;

FIGS. 7(b) and 7(c) respectively show the glass gob cooling device;

DETAILED DESCRIPTION OF THE PREFERRED EMBODIMENTS

The glass gob production method as a first embodiment according to the present invention and the glass gob production device used in the first embodiment are described hereinafter with reference to the accompanying drawings.

Figure 1:
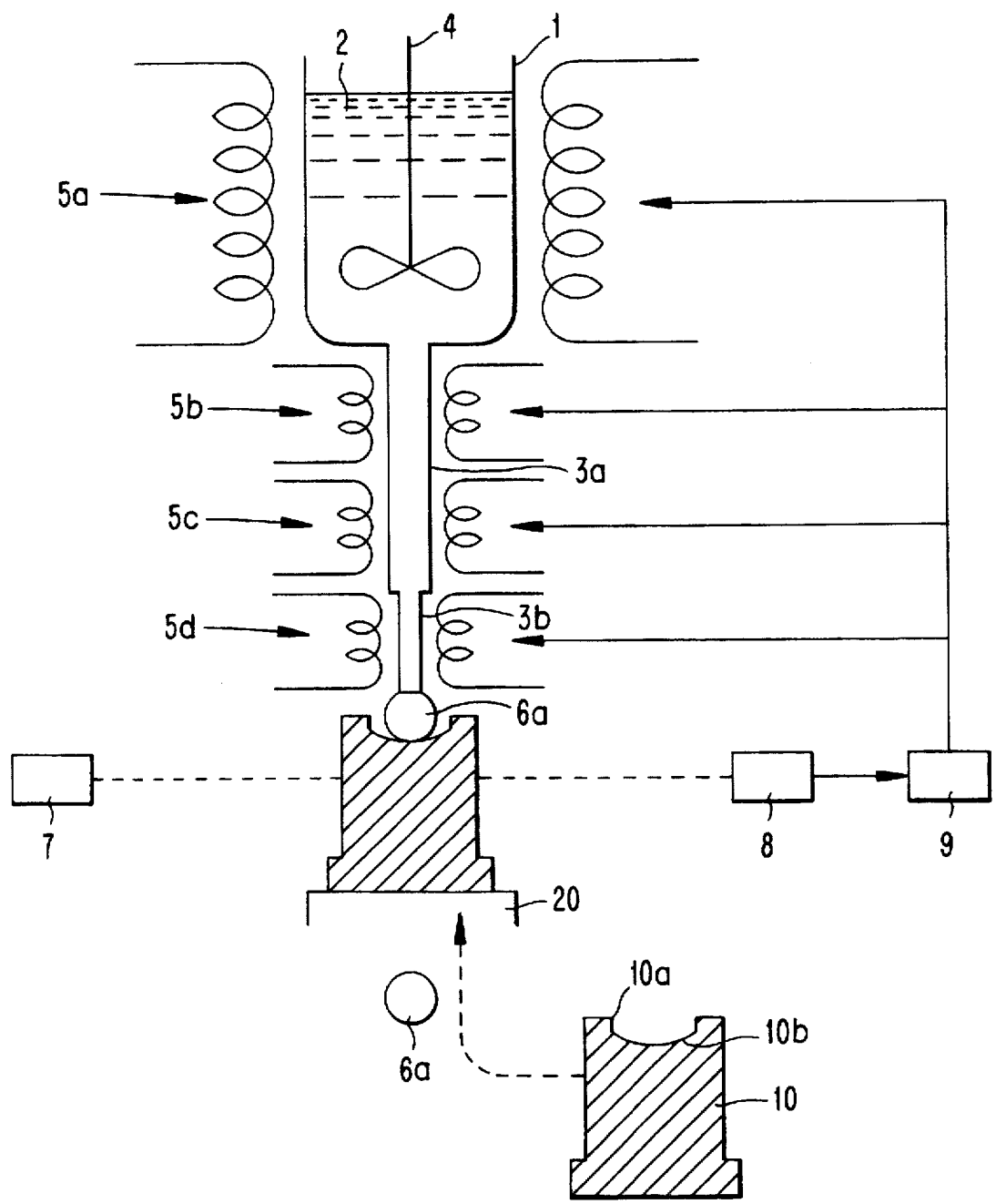
FIG. 1 briefly shows the glass gob production device according to the present invention.

As shown in FIG. 1, the glass gob device comprises a crucible 1, nozzles 3a and 3b for conducting the molten glass therefrom, and a glass retaining mechanism (not illustrated) provided with a support member 10 for retaining the glass drop 6a dropped from the nozzle tip.

Support member 10 is installed on moving member 20 which is movable in one direction and an opposite direction. Moving member 20 is controlled so as to be continuously or intermittently movable.

Crucible 1 is provided with a mixing rod 4 for homogenizing the molten glass 2.

The type of glass used in the present invention is not specifically limited, and normal glass lens raw materials may be used, such as raw materials for optical lenses, e.g., dense flint glass, lanthanum glass, borosilicate crown glass and the like.

Specifically, usable types of glass include high viscosity and low melting temperature glass without a devitrification range such as SF57, SF6, SF9 and the like, high viscosity and high melting temperature glass without a devitrification range such as SK5, SK14, SK16 and the like, high devitrification, high viscosity and high melting temperature glass such as PKS1 and the like, high devitrification, low viscosity and high melting temperature glass such as LaK10, LaK59, LaK71 and the like, high devitrification, low viscosity and low melting temperature glass such as FKS51, FKS53 and the like. In the present invention, high devitrification, low viscosity and high melting temperature glass as well as high devitrification, low viscosity and low melting temperature glass can be used which cannot be used in conventional glass gob production methods.

The temperature of the crucible and nozzle is maintained at a predetermined temperature by heaters $5a\sim5d$. The temperature of the crucible and nozzle may be set in accordance with the characteristics of the glass and the size of the glass gob to be obtained insofar as said temperature is outside the liquid phase temperature range, and is normally within the range of $500°\sim1,400°$ C. In particular, when the temperature of the nozzle bottom portion $3b$ is set high and the temperature of the top portion $3a$ is set low, the glass gob $6a$ can be readily dropped. It is desirable that the temperature of the bottom portion is set higher than the top portion by about $50°\sim200°$.

The time interval during which the glass gob drops at this time is a constant interval. When the glass gob starts to drop, the support member 10 is moved lower than the position shown in FIG. 1. The start of the drop of the glass gob is detected by a sensor provided with a photoemitter 7 and photoreceptor 8, and a signal is output to control section 9 to provide for accurate drop interval control by feedback to the heaters. The drop interval can be optionally set by changing the heat release value of the heaters $5a\sim5d$ and changing the viscosity of the glass. An interval of $1\sim20$ seconds is desirable for stable dropping. After the start of the drop of the glass gob is detected by the sensor, the support member 10 is raised to the position shown in FIG. 1 to receive the first glass gob.

Figure 2:
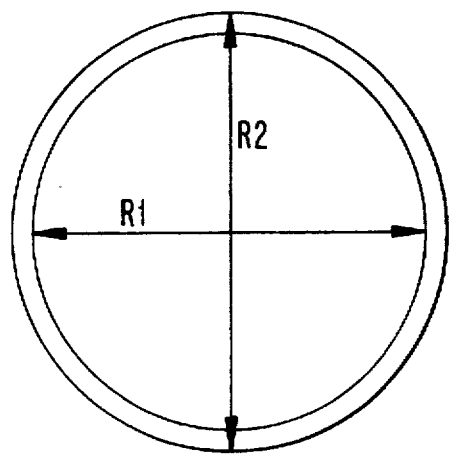
FIG. 2 is a section view of the nozzle in the glass gob production device of FIG. 1.

The weight of one glass gob is determined by the shape of the tip of nozzle $3b$ shown in FIG. 2. The nozzle tip $3b$ desirably has an internal diameter R1 of $\phi$ 0.1 mm or greater but $\phi$ 1 mm or less, and preferably $\phi$ 0.3 mm to $\phi$ 0.8 mm, and an external diameter R2 of $\phi$ 2 mm or greater but $\phi$ 15 mm or less, and preferably $\phi$ 5 mm to $\phi$ 15 mm, so as to obtain glass gobs of stable weight, excellent internal quality, and no devitrification. When the internal diameter R1 and external diameter R2 of the nozzle are set within the aforementioned ranges, glass gobs of $0.2\sim1.5$ g are obtained. When the internal diameter R1 of the nozzle is too small, the glass dropping interval becomes longer, and the retention time of glass gob production becomes undesirably longer. When the internal diameter R1 is too large, glass gobs are unobtainable because the discharged glass becomes a laminar flow from the surface tension of the glass. When the external diameter R2 of the nozzle is too small, the retention time during glass gob production becomes undesirably long and the obtained glass gob becomes smaller. There is no increase in the weight of the glass gob obtained by a gravity drop due to the use of the surface tension of the glass even when the external diameter R2 of the nozzle is larger than the aforesaid range.

When the nozzle internal diameter R1 is $\phi$ 0.1 mm or greater but $\phi$ 1 mm or less, and the nozzle external diameter R2 is $\phi$ 2 m or greater but 15 mm or less, the nozzle temperature normally may be set above the liquid phase temperature and a dropping interval within a range of $1\sim20$ seconds may be stably obtained even when using a high devitrification, low viscosity glass of, for example, less than 20 poise, so as to produce a glass gob having excellent weight stability and excellent internal quality completely lacking devitrification and striae.

Although the aforesaid example is described in terms of using a heater to heat the crucible and nozzle, other heating means may be used, e.g., high frequency coil, infrared lamp or the like. High frequency heaters are particularly effective when heating to high temperatures of $1,000°$ C. or higher.

The glass gob is formed at the nozzle tip under the aforesaid temperature-controlled conditions, said glass gob is retained on the support member 10 until the gob attains a predetermined weight.

Although the support member 10 may be formed of ceramic material, hard metal alloy, carbon, metal and the like, carbon or ceramic material is desirable in consideration of excellent heat transmission and low reactivity to glass.

An indentation provided on the center portion of support member 10 comprises a bottom surface $10b$ and a reference surface $10a$ extending in a direction perpendicular to the circumference of the bottom surface. The reference surface is transferred to the transferred glass gob via contact of the glass gob with the reference surface $10a$ of support mender 10. Thus, a glass gob can be obtained which has a predetermined reference surface on its exterior portion by changing the shape of the reference surface $10a$ of the support member.

Figure 3:
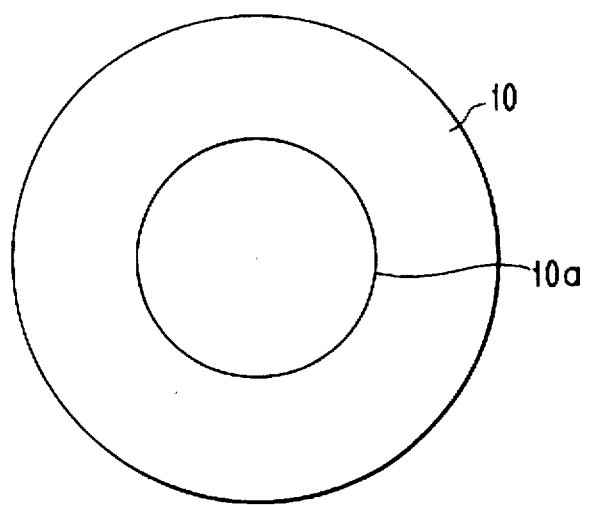
FIG. 3 shows the support member in the glass gob production device of FIG. 1 as viewed from above.

If the reference surface $10a$ of the support member has a convex configuration, a glass gob having a concave shaped reference surface on its exterior portion is formed through the contact of the glass gob with the reference surface $10a$ of the support member. If the reference surface $10a$ of the support member has a concave configuration, a glass gob having a convex shaped reference surface on its exterior portion is formed through the contact of the glass gob with the reference surface $10a$ of the support member. If the reference surface $10a$ of the support member has a smooth surface, a glass gob having a smooth shaped reference surface on its exterior portion is formed through the contact of the glass gob with the reference surface $10a$ of the support member. The reference surface $10a$ may also be ring-shaped (refer to FIG. 3) so as to be partially concave or convex; if the reference surface $10a$ of the support member has a ring-like configuration, the largest lens can be simply provided in accordance with the size of the glass gob.

Although neither the position of the reference surface $10a$ of the support member nor the depth or height of the finished configuration of the convexity or concavity when such is provided on the reference surface is particularly limited insofar as such allows easy and simple placement of the glass gob in the press tool via the reference surface transferred to the glass gob, a smooth reference surface $10a$ is desirable. When the reference surface $10a$ is smooth, precise and stable positioning is easily attained when setting the glass gob in the press tool.

On the other hand, the surface of the glass gob which does not come into contact with the support member (hereinafter referred to as "top surface") is a free surface, the shape of which is difficult to control. The top surface shape of the obtained glass gob can be changed by changing the height of the glass liquid level.

The glass gob production process is described hereinafter with reference to FIG. 4a through 4g and FIGS. 5a and 5b.

FIG. 4 shows the glass gob outside and below the nozzle. In the drawing, reference number $3b$ refers to the nozzle tip, reference number 11 refers to a nozzle tip heating coil. Reference number 10 refers to a support member provided with a ring-like reference surface for retaining the glass. A heating coil 12 for maintaining the support member retaining the glass at high temperature is provided below the nozzle.

The support member temperature may be room temperature and need not be specifically controlled. When the support member temperature is too low, however, wrinkles readily occur in the glass; the heating coil 12 is effective for high temperature control. Specifically, the temperature is controlled in the vicinity of the glass transition point (Tg) to prevent reaction with the molten glass. If the nozzle tip has a closed portion filled with a non-acidic gas such as nitrogen, argon or the like, reaction between the glass and the support member is reduced, and high temperature control is possible.

The support member 10 is positioned 10~50 cm below the nozzle (refer to FIG. 4a), and is raised to the nozzle tip (refer to FIG. 4b) by the moving member 20 in accordance with the glass gob drop timing. Support member 10 is raised to a position capable of continuously retaining successively dropped glass gobs without separation (refer to FIG. 4c). When the weight of the glass gob is 0.2 g to 1.5 g, the support member 10 is raised to a position 3~10 mm below the nozzle tip 3b in accordance with said weight value.

Glass gobs are consecutively retained as the support member 10 is continuously lowered by moving member 20 so as to achieve a constant distance between the nozzle tip and the glass liquid surface 6d (FIGS. 4c, 4d). The speed with which support member 10 is intermittently lowered differs in accordance with the dropping interval and the weight of the glass gob. This speed is slow when the glass gob weight is low, and the speed is high when the weight is high. This speed is fast when the glass gob drop interval is short, and the speed is slow when the drop interval is long.

When the glass retention ends, the support member 10 is lowered at high speed (refer to FIG. 4f) via the high speed downward movement of moving member 20 to cut the glass. The lowering is accomplished only to separate and cut the glass by surface tension, and the lowering distance is a distance (e.g., 10 mm) sufficient to cut the glass. Although a line 6e occurs at the break in the glass at this time, said line is readily absorbed into the interior of the glass gob 6c via the radiation heat from nozzle 3b due to the position of said line near the nozzle.

The support member is lowered (standby position). Thus, a glass gob 6c is obtained which has no shear mark, no striae or devitrification, and has weight stability (FIG. 4g).

FIG. 5a shows the distance 1 from nozzle tip 3b to support member 10, and FIG. 5B is a graph of the change in distance 1 in the processes of FIGS. 4a~4g, and illustrates the intermittent lowering operation of support member 10.

The thus-obtained glass gob, after cooling solidification, may be press molded in a mold to achieve a desired top surface of the glass gob, or may be press molded prior to cooling solidification.

According to the present invention, glass gobs of optional size can be obtained by retaining a plurality of glass gobs on a support member such that interfaces do not occur, thereby permitting the production of larger aperture lenses.

When the nozzle temperature is outside the liquid phase range, no devitrification is observable in the glass gob and the internal quality is excellent.

The support member which still retains the glass is gradually lowered to maintain a uniform glass liquid level so as to allow the stabilized cutting of the glass, and produce glass gobs having slight weight dispersion.

Since the glass gob comes into contact with the ring-like reference surface 10a of the support member, said reference surface is transferred to the exterior of the glass gob. The shape of the reference surface on the exterior of the glass gob can be optionally changed to a position which does not impair the lens function of the formed lens after press molding by changing the reference surface configuration (diameter, width) of the support member.

First Experiment

In the first experiment, 0.4 g glass drops were produced at 2 second intervals under the following conditions (numbers in parentheses refer to the reference numbers of FIG. 1):

Glass (2): LaK10 (Tg: 629° C.; At: 669° C.) Heater temperatures
(5a) 1,350° C.
(5b) (5c) 1,300° C.
(5d) 1,350° C.

Nozzle tip (3b) internal dia.: ⌀1 mm; external dia.: ⌀5 mm

The support member 10 having a reference surface on its exterior was raised to a height a distance of 5 mm from the nozzle, and the glass was retained for 8 seconds. During the aforesaid 10 seconds, the support member was intermittently lowered only 5 mm (0.625 mm/sec). When the glass retention ended, the support member was lowered a distance of 10 mm at high speed to cut the glass. Then, the support member was lowered 20 cm, cooled, and a 2.0 g glass gob 6c was obtained. The reference surface was formed on the exterior of the obtained glass gob, and a shear mark was not observed.

A glass gob production method as a second embodiment according to the present invention is described with reference to FIGS. 6a and 6b. The glass gob production device for dropping the glass drops is identical to the device used in the first embodiment. The mechanism for retaining and cutting the glass is also identical to that of the first embodiment, although the support member while retaining the glass is lowered by the moving member via a different operation.

FIG. 6a shows the distance 1 from the nozzle tip 3b to the support member 10 as previously shown in FIG. 4a. FIG. 6B is a graph of the change in distance 1 in the various processes of glass gob production in the second embodiment, and describes the intermittent operation wherein there is a gradual lowering of support member 10.

In the second embodiment, support member 10 provided with a ring-like reference surface is intermittently lowered while retaining glass, said lowering occurring synchronously with the glass drop interval, as shown in FIG. 6b. For example, when the glass drop interval is 2 seconds and the total retaining time is 10 seconds, the support member 10 is intermittently lowered 5 mm in 10 seconds in the first embodiment. In the second embodiment, however, support member 10 is gradually lowered a total of 5 mm in four stages every 2 seconds in the 10 second interval.

In this case, the liquid level height gradually becomes higher while the support member is stopped due to the intermittent operation of the support member, but said liquid level is returned to a predetermined height by the lowering of the support member during the next glass generation, thereby maintaining an overall constancy.

Although the operation of the support member is complex in the second embodiment, glass gob weight management is accomplished with greater precision because the support member is lowered synchronously with the glass generation at the nozzle tip.

The present invention allows the production of glass gobs of large weight provided with a reference surface. When the weight of a glass gob becomes greater however, the heat content of the glass also increases, and the glass is difficult to cool. As a result, a depression 6f appears in the center portion of the glass, as shown in FIG. 7a. Therefore, in order to prevent a depression on the surface of the glass, a cooling member 14 may be brought into light contact with the center portion of the gob, as shown in FIG. 7b, or a cooling gas may be blown on the center portion only, as shown in FIG. 7c. Reference number 15 in FIG. 7c refers to a heating member which heats the cooling glass to a predetermined temperature.

Cooling member 14 is desirably formed of a material having a high thermal conductivity, such as ceramic, hard metal, carbon and metal. The temperature of the cooling member is desirably Tg-200° C., and the cooling gas temperature is desirably Tg-200° C. The reference Tg expresses the glass transition temperature.

Figure 8:
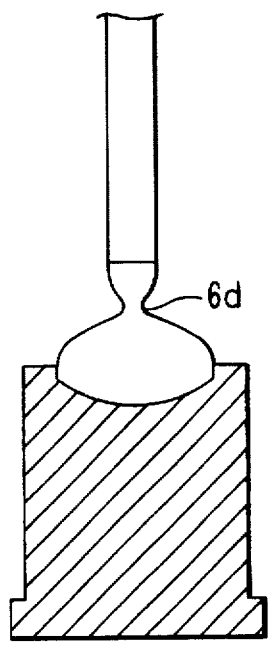
FIG. 8 shows the shape of the top surface of the glass remaining on the support member.
Figure 9A:
FIG. 9(a) shows the shape of the top surface of the glass when a short distance is set between the nozzle tip and the fluid glass surface of the residual.
Figure 9B:
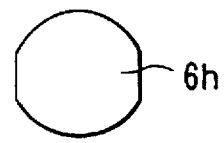
FIG. 9(b) shows the shape of the top surface of the glass gob when a long distance is set between the nozzle tip and the fluid glass surface of the residual.

When the distance is reduced between the nozzle tip and the liquid level of the retained glass and the dropping time of the glass drop is also reduced, the top surface of the gob approaches flatness (6g) as shown in FIG. 9a. On the other hand, when the distance is increased between the nozzle tip and liquid level 6d of the retained glass, the top surface of the gob becomes convex (6h) as shown ill FIG. 9b (refer to FIGS. 8, 9a and 9b). Specifically, if the distance from the nozzle tip to the support member is 2 mm or less, the top surface of the gob approaches flatness, whereas said top surface becomes convex when the distance is 2 mm or more.

Figure 10:
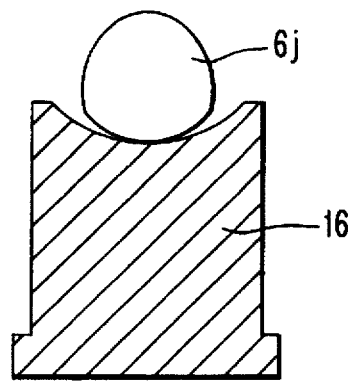
FIG. 10 shows a conventional glass gob support method.
Figure 11:
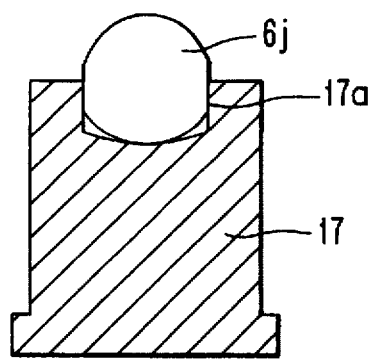
FIG. 11 illustrates a method for supporting a glass gob produced by the glass gob production method according to the present invention.

FIG. 10 shows a conventional method for supporting glass gob 6i. The operation for directly placing the glass gob on the mold 16 is readily accomplished, although positioning of the gob is unstable. Therefore, dislocation occurs during press molding of the glass gob, such that after said molding astigmatism and distortion occur in the lens transfer surface. Glass gob 6j formed by the device and method of the present invention is supported by the support portion of mold 17 which makes contact with reference surface 17a and is formed so as to match the reference surface 17a of glass gob 6j (refer to FIG. 10), such that there is no dislocation during press molding, positioning precision is improved, and there is no astigmatism or distortion of the lens transfer surface after molding.

Figure 12:
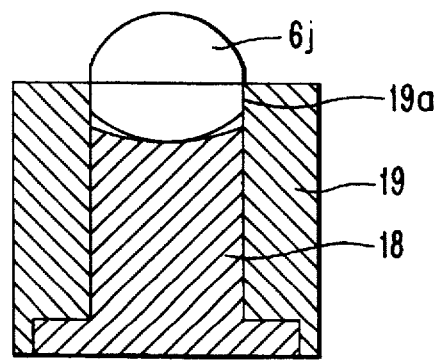
FIG. 12 illustrates another method for supporting a glass gob produced by the glass gob production method according to the present invention.

As shown in FIG. 12, when glass gob 6j is supported by the support portion of barrel 19 which makes contact with reference surface 19a and is formed so as to match the reference surface 19a of glass gob 6j, there is no dislocation during press molding, positioning precision is improved, and there is no astigmatism or distortion of the lens transfer surface after molding.

Second Experiment

Figure 13:
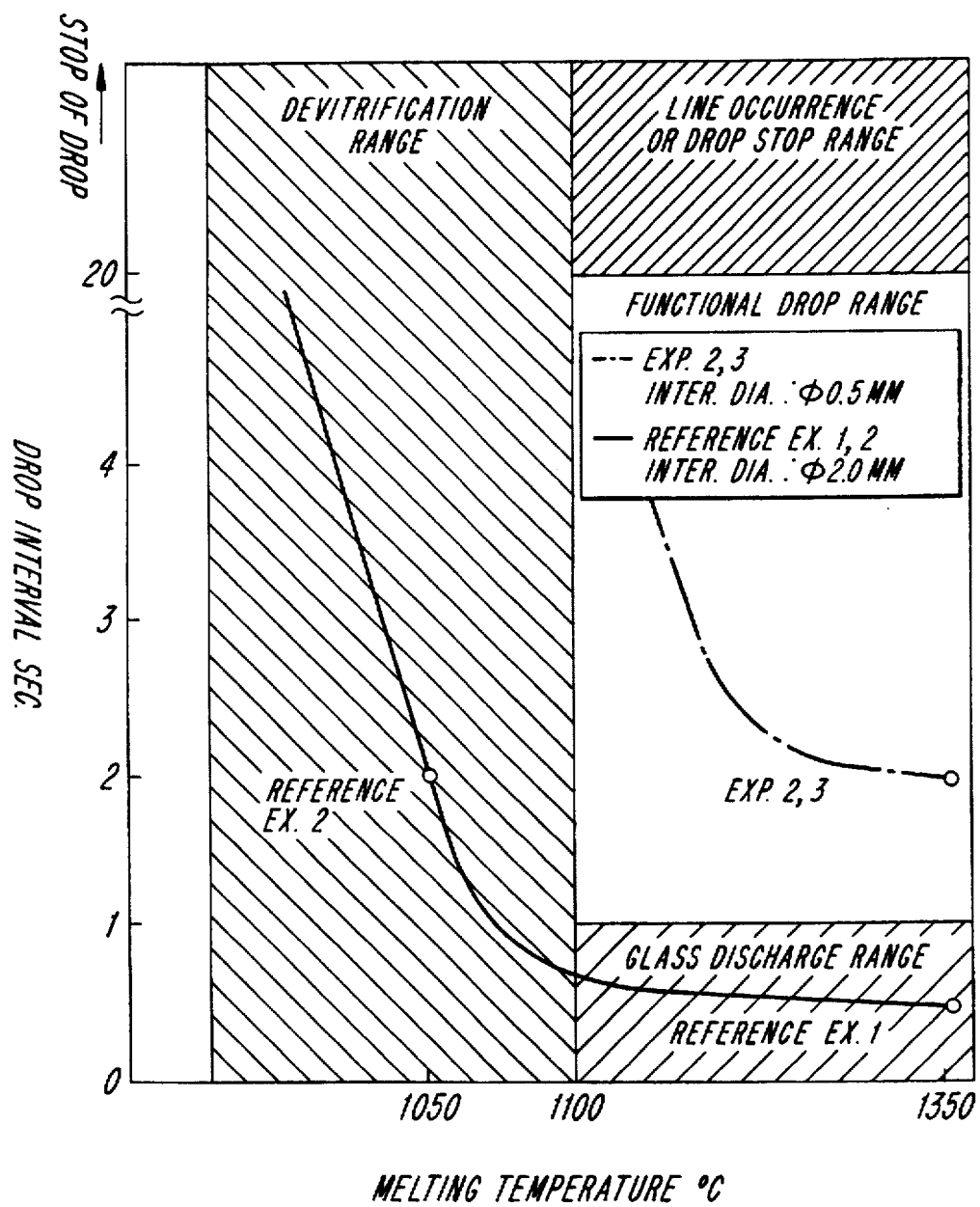
FIG. 13 illustrates the relationship between the glass melt temperature, and devitrification/glass drop distance in the second and third embodiments according to the present invention and reference examples 1 and 2.

FIG. 13 shows the relationship between the melting temperature and the drop interval of glass LaK10.

In the second embodiment, 0.4 g glass drops were produced at 2 second intervals under the following conditions (numbers in parentheses refer to the reference numbers of FIG. 1):

Glass (2): LaK10 (Tg: 629° C.; At: 669° C., T1(liquid-phase): 770° C.~1100° C.)

Heater temperatures
(5a) 1.350° C.
(5b) (5c) 1.200° C.
(5d) 1.250° C.

Glass viscosity: 5 poise

Nozzle tip (3b) internal dia.: ⌀0.5 mm; external dia.: ⌀10 mm (FIG. 13: functional drop range)

The support member 10 was raised to a height a distance of 5 mm from the nozzle, and after one drop of glass was retained, said support member 10 was lowered in one stroke a distance of 10 mm at high speed. Then, the support member was lowered 20 cm, cooled, and a 0.4 g glass gob was obtained. No shear mark was observed on the obtained glass gob. The quality of the interior portion of the gob was excellent and no devitrification or striae were noted.

Third Experiment

The same conditions were used as in the first embodiment wherein LaK10 glass drops were obtained at 2 second intervals. The support member 10 was raised to a height a distance of 5 mm from the nozzle, and the glass was retained for 10 seconds. During the aforesaid 10 seconds while the glass is retained, the support member was gradually lowered only 5 mm (0.625 mm/sec). When the glass retention ended, the support member was lowered in one stroke a distance of 10 mm at high speed to cut the glass by surface tension. Then, the support member was lowered 20 cm, cooled, and a 2.0 g glass gob was obtained. The obtained glass gob did not exhibit a shear mark. The quality if the interior portion of the gob was excellent and no devitrification or striae were observed.

Reference Example 1

The conditions of the second experiment were used with the exception that the nozzle tip diameter was changed from ⌀0.5 mm to ⌀2 mm. Since the nozzle internal diameter was too large relative to the glass viscosity (5 poise), the glass discharge via surface tension became a laminar flow causing the glass to flow continuously and preventing a gob from being produced. (FIG. 13: glass discharge range)

Reference Example 2

Glass (2): LaK10 (Tg: 629° C.; At: 669° C.; T1: 770° C.~1,100° C.)

Heater temperatures
(5a) 1.350° C.
(5b) (5c) 900° C.
(5d) 1.050° C.

Glass viscosity: 20 poise

Nozzle tip (3b) internal dia.: ⌀2.0 mm; external dia.: ⌀10 mm

Since the nozzle internal diameter was changed from ⌀0.5 mm to ⌀2 mm, the glass viscosity was increased, for example, to 20 poise or higher by reducing the nozzle temperature (heaters 5a and 5b) to below liquid phase temperature conditions to obtain a 0.4 g glass gob at 2 second intervals. Since the, nozzle temperature was within the devitrification range, however, crystals grew from the nozzle tip, thereby preventing the glass from dropping. (FIG. 13: devitrification range)

Fourth Experiment

Glass (2): LaK10 (Tg: 632° C.; At: 672° C.; T1: 750° C.~1,150° C.)

Heater temperatures
(5a) 1.350° C.
(5b) (5c) 1.200° C.
(5d) 1.250° C.

Glass viscosity: 4 poise

Nozzle tip (3b) internal dia.: ⌀0.3 mm; external dia.: ⌀10 mm

Under the above conditions, 0.4 g glass gobs were obtained in 2 second intervals.

First, the support member 10 was raised to a height a distance of 5 mm from the nozzle, and the glass was retained for 10 seconds. During the aforesaid 10 seconds of retention, the support mender was gradually lowered only 5 mm (0.625 mm/sec). When the glass retention ended, the support member was lowered a distance of 10 mm in one stroke at high speed to cut the glass by surface tension. Then, the support member was lowered 20 cm, cooled, and a 2.0 g glass gob was obtained. No shear mark was exhibited on the obtained glass gob. The quality of the internal portion of the gob was excellent and no devitrification or striae were observed.

Reference Example 3

The conditions of the fourth experiment were used with the exception that the nozzle internal diameter was changed from ø0.3 mm to ø2 mm. Since the nozzle internal diameter was too large relative to the glass viscosity (4 poise), the glass discharge via surface tension became a laminar flow causing the glass to flow continuously and preventing a gob from being produced. When the nozzle temperature was reduced to allow drops to form, the temperature was below the liquid phase temperature, and devitrification was observed.

Fifth Experiment

Glass (2): LaSF59 (Tg: 600° C.; At: 633° C.; Tl: 750° C.~1,150° C.)

Heater temperatures
(5a) 1,350° C.
(5b) (5c) 1,200° C.
(5d) 1,250° C.

Glass viscosity: 4 poise

Nozzle tip (3b) internal dia.: ø0.5 mm; external dia.: ø10 mm

Under the above conditions, 0.59 g glass gobs were obtained in 2 second intervals.

First, the support member 10 was raised to a height a distance of 5 mm from the nozzle, and the glass was retained for 10 seconds. During the aforesaid 10 seconds of retention, the support member was gradually lowered only 5 mm (0.625 mm/sec). When the glass retention ended, the support member was lowered a distance of 10 mm in one stroke at high speed to cut the glass by surface tension. Then, the support member was lowered 20 cm, cooled, and a 2.5 g glass gob was obtained. No shear mark was exhibited on the obtained glass gob. The quality of the internal portion of the gob was excellent and no devitrification or striae were observed.

Reference Example 4

The conditions of the fifth experiment were used with the exception that the nozzle internal diameter was changed from ø0.5 mm to ø2 mm. Since the nozzle internal diameter was too large relative to the glass viscosity (4 poise), the glass discharge via surface tension became a laminar flow causing the glass to flow continuously and preventing a gob from being produced. When the nozzle temperature was reduced to increase the glass viscosity to 20 poise or more so as to allow drops to form, the temperature was below the liquid phase temperature, and devitrification was observed.

Sixth Experiment

Glass (2): PKS1 (Tg: 549° C.; At: 591° C.; Tl: ~1,200° C.)

Heater temperatures
(5a) 1,350° C.
(5b) (5c) 1,300° C.
(5d) 1,350° C.

Glass viscosity: 10 poise

Nozzle tip (3b) internal dia.: ø0.8 mm; external dia.: ø10 mm

Under the above conditions, 0.5 g glass gobs were obtained in 2 second intervals.

First, the support member 10 was raised to a height a distance of 5 mm from the nozzle, and the glass was retained for 10 seconds. During the aforesaid 10 seconds of retention, the support member was gradually lowered only 5 mm (0.625 mm/sec). When the glass retention ended, the support member was lowered a distance of 10 mm in one stroke at high speed to cut the glass by surface tension. Then, the support member was lowered 20 cm, cooled, and a 2.5 g glass gob was obtained. No shear mark was exhibited on the obtained glass gob. The quality of the internal portion of the gob was excellent and no devitrification or striae were observed.

Reference Example 5

The conditions of the sixth experiment were used with the exception that the nozzle internal diameter was changed from ø0.8 mm to ø2 mm. Since the nozzle internal diameter was too large relative to the glass viscosity (10 poise), the glass discharge via surface tension became a laminar flow causing the glass to flow continuously and preventing a gob from being produced. When the nozzle temperature was reduced to increase the glass viscosity to 20 poise or more so as to allow drops to form, the temperature was below the liquid phase temperature, and devitrification was observed.

Seventh Experiment

Flourine generated by melting fluoride glass is absorbed, processed, and discharged via a duct system not shown in the illustrations.

Glass (2): FKS51 (Tg:,Tl: 800° C.)

Heater temperatures
(5a) 850° C.
(5b) 800° C.
(5c) 850° C.

Glass viscosity: 3.5 poise

Nozzle tip (3b) internal dia.: ø0.4 mm; external dia.: ø10 mm

Under the above conditions using low viscosity glass drop production, 0.4 g glass gobs were obtained in 2 second intervals.

First, the support member 10 was raised to a height a distance of 5 mm from the nozzle, and the glass was retained for 10 seconds. During the aforesaid 10 seconds of retention, the support meter was gradually y lowered only 5 mm (0.625 mm/sec). When the glass retention ended, the support member was lowered a distance of 10 mm in one stroke at high speed to cut the glass by surface tension.

Then, the support member was lowered 20 cm, cooled, and a 2.0 g glass gob was obtained. No shear mark was exhibited on the obtained glass gob. The quality of the internal portion of the gob was excellent and no devitrification or striae were observed.

Reference Example 6

The conditions of the seventh experiment were used with the exception that the nozzle internal diameter was changed from ø0.4 mm to ø2 mm. Since the nozzle internal diameter was too large relative to the glass viscosity (3.5 poise), the glass discharge via surface tension became a laminar flow causing the glass to flow continuously and preventing a gob from being produced. When the nozzle temperature was reduced to increase the glass viscosity to 20 poise or more so as to allow drops to form, the temperature was below the liquid phase temperature, and devitrification was observed.

High viscosity glass outside the devitrification range is described below.

Eighth Experiment

Glass (2):SK5 (Tg: 658° C.; At: 704° C.; Tl: none)

Heater temperatures
(5a) 1,350° C.
(5b) 1,300° C.
(5d) 1,350° C.

Glass viscosity: 20 poise

Nozzle tip (3b) internal dia.: ø0.8 mm; external dia.: ø10 mm

Under the above conditions, 0.5 g glass gobs were obtained in 2 second intervals.

First, the support member 10 was raised to a height a distance of 5 mm from the nozzle, and the glass was retained for 8 seconds. During the aforesaid 10 seconds of retention, the support member was gradually lowered only 5 mm (0.625 mm/sec). When the glass retention ended, the support member was lowered a distance of 10 mm in one stroke at high speed to cut the glass by surface tension. Then, the support member was lowered 20 cm, cooled, and a 2.5 g glass gob was obtained. No shear mark was exhibited on the obtained glass gob. The quality of the internal portion of the gob was excellent and no devitrification or striae were observed.

Reference Example 7

The conditions of the seventh experiment were used with the exception that the nozzle internal diameter was changed from ø0.8 mm to ø2 mm. Since the nozzle internal diameter was too large relative to the glass viscosity (20 poise), the glass discharge via surface tension became a laminar flow causing the glass to flow continuously and preventing a gob from being produced. When the nozzle temperature was reduced to increase the glass viscosity to 20 poise or more so as to allow drops to form, the viscosity of the glass was too high to allow drops to form by surface tension, such that a thread of glass was formed.

Ninth Experiment

Glass (2): SF57 (Tg: 443° C.; At: 463° C.; Tl: none)

Heater temperatures
(5a) 1,100° C.
(5b) (5c) 1,100° C.
(5d) 1,150° C.

Glass viscosity: 10 poise

Nozzle tip (3b) internal dia.: ø0.8 mm; external dia.: ø10 mm

Under the above conditions, 0.5 g glass gobs were obtained in 2 second intervals.

First, the support member 10 was raised to a height a distance of 5 mm from the nozzle, and the glass was retained for 10 seconds. During the aforesaid 10 seconds of retention, the support member was gradually lowered only 5 mm (0.625 mm/sec). When the glass retention ended, the support member was lowered a distance of 10 mmin one stroke at high speed to cut the glass by surface tension. Then, the support member was lowered 20 cm, cooled, and a 2.5 g glass gob was obtained. No shear mark was exhibited on the obtained glass gob. The quality of the internal portion of the gob was excellent and no devitrification or striae were observed.

Reference Example 8

The conditions of the eighth experiment were used with the exception that the nozzle internal diameter was changed from ø0.8 mm to ø2 mm. Since the nozzle internal diameter was too large relative to the glass viscosity (10 poise), the glass discharge wia surface tension became a laminar flow causing the glass to flow continuously and preventing a gob from being produced. When the nozzle temperature was reduced to increase the glass viscosity to 20 poise or more so as to allow drops to form, the viscosity of the glass was too high to allow drops to form, such that a thread of glass was formed.

Tenth Experiment

The conditions of the second experiment were used with the exception that the nozzle tip external diameter was changed from ø10 mm to ø5 mm to obtain 0.2 g glass drops at 1.5 second intervals. The conditions of the third experiment were used with the exception that the glass retention time was changed from 10 seconds to 20 seconds to obtain 2 g glass gobs. The obtained glass gobs did not exhibit shear marks. The quality of the interior portion of the gobs was excellent and devitrification, striae, and threads were not observed.

Reference Example 9

When the nozzle exterior diameter was increased to ø15 mm and greater, the weight of the glass drop obtained by gravity drop using surface tension of the glass did not increase, but the glass drop interval became markedly long. The conditions of the second experiment were used with the exception that the nozzle tip external diameter was changed from ø10 mm to ø18 mm to obtain 0.4 g glass drops at 25 second intervals. The conditions of the third experiment were used with the exception that the glass retention time was changed to 125 seconds to obtain 2 g glass gobs. Although the obtained glass gobs did not exhibit shear marks, striae did appear due to the excessively long retention time.

In the previously described experiments, 2~10 and reference examples 1~9, the type of molten glass, melting temperature, molten glass viscosity, and internal and external nozzle diameters were varied to produce glass gobs, the results of which are shown in Table 1. In all cases, the melting temperature and nozzle temperature may be set at or above the liquid phase temperature when the nozzle internal diameter is ø1 mm or greater. The glass gobs obtained under such conditions exhibited no devitrification or striae.

TABLE 1

| Type | Low Viscosity Glass | | | | | High Viscosity Glass | |
| --- | --- | --- | --- | --- | --- | --- | --- |
| | LaK10 | LaF71 | LaSF59 | PKS1 | FKS51 | SK5 | SF6 |
| Liquid Phase Temp (°C.) | 1100 | 1150 | 1150 | 1200 | 800 | None | None |

TABLE 1-continued

| | Low Viscosity Glass | | | | | | | | | | | | High Viscosity Glass | | | |
|---|---|---|---|---|---|---|---|---|---|---|---|---|---|---|---|---|
| Type | LaK10 | | | | | LaF71 | | LaSF59 | | PKS1 | | FKS51 | SK5 | | SF6 | |
| Nozzle ext. Dia. (mm) | 10.0 | 5.0 | 18.0 | 10.0 | 10.0 | 10.0 | 10.0 | 10.0 | 10.0 | 10.0 | 10.0 | 10.0 | 10.0 | 10.0 | 10.0 | 10.0 |
| Nozzle int. Dia. (mm) | 0.5 | 0.5 | 0.5 | 2.0 | 0.3 | 2.0 | 0.5 | 2.0 | 0.8 | 2.0 | 0.4 | 2.0 | 0.8 | 2.0 | 0.8 | 2.0 |
| Melting temp (°C.) | 1350 | 1350 | 1350 | 1350 | 1350 | 1350 | 1350 | 1350 | 1350 | 1350 | 850 | 850 | 1350 | 1350 | 1100 | 1100 |
| Top nozzle (°C.) | 1200 | 1200 | 1200 | 900 | 1200 | 900 | 1200 | 900 | 1300 | 900 | 850 | 750 | 1300 | 1200 | 1100 | 850 |
| Bottom nozzle (°C.) | 1250 | 1250 | 1250 | 1050 | 1250 | 1050 | 1250 | 1050 | 1350 | 1050 | 900 | 800 | 1350 | 1250 | 1150 | 900 |
| Glass viscosity | 5 | 5 | 5 | 20 | 4 | not measured | 4 | 20 | 10 | 240 | 3.5 | not measured | 20 | 150 | 10 | 600 |
| Drop wt. | 0.4 | 0.2 | 0.4 | 0.4 | 0.4 | 0.4 | 0.5 | 0.5 | 0.5 | 0.5 | 0.4 | 0.4 | 0.5 | 0.5 | 0.5 | 0.5 |
| Drop interval(s) | 2.0 | 1.5 | 25.0 | 2.0 | 2.0 | 2.0 | 2.0 | 2.0 | 2.0 | 2.0 | 2.0 | 2.0 | 2.0 | 2.0 | 2.0 | 2.0 |
| Retention time(s) | 10.0 | 15.0 | 125 | 10.0 | 10.0 | 10.0 | 10.0 | 10.0 | 10.0 | 10.0 | 10.0 | 10.0 | 10.0 | 10.0 | 10.0 | 10.0 |
| Gob wt. (g) | 2.0 | 2.0 | 2.0 | 2.0 | 2.0 | 2.0 | 2.5 | 2.5 | 2.5 | 2.5 | 2.0 | 2.0 | 3.2 | 3.2 | 2.5 | 2.5 |
| Inspection result | Good | Good | Striae | Dev/ striae | Good | Dev/ striae | Good | Dev/ striae | Good | Dev/ striae | Good | Dev/ striae | Good | Thread/ striae | Good | Thread/ striae |
| | Exp 2,3 | Exp 10 | Ref 9 | Ref 2 | Exp 4 | Ref 3 | Exp 5 | Ref 4 | Exp 6 | Ref 5 | Exp 7 | Ref 6 | Exp 8 | Ref 7 | Exp 9 | Ref 8 |

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A glass gob production device, said glass gob being reformed into an optical element by press-molding, comprising:

a crucible which accommodates molten glass therein;

a nozzle with one end which is connected to said crucible and an other end from which the molten glass in the crucible is discharged; and a support member opposite to the other end of the nozzle and having an indentation on the surface thereof for receiving and retaining the discharged molten glass in the indentation to form a glass gob, said indentation having a bottom surface and a reference surface extending in a direction perpendicular to the circumference of the bottom surface for transferring a glass gob reference surface to said glass gob.

2. A glass gob production device as claimed in claim 1 wherein said reference surface of the indentation is ring-shaped.

3. A glass gob production device as claimed in claim 1 wherein drops of the molten glass are discharged from the other end of the nozzle at a predetermined timing.

4. A glass gob production device as claimed in claim 3 further comprising:

a heating member which is provided around the crucible and the nozzle to heat the molten glass in the crucible and the nozzle at a predetermined temperature;

a detecting member which detects the timing at which a drop of the molten glass is discharged from the nozzle; and a controller which controls heating by the heating member based upon the detected timing.

5. A glass gob production device as claimed in claim 1 further comprising:

a moving member which lowers the support member at high speed so that the molten glass retained in the indentation of the support member is cut.

6. A support member which receives molten glass discharged from a tip of a nozzle connected to a crucible, said support member comprising:

an indentation which is provided on the surface of the support member so as to be opposite to the nozzle tip and retains the molten glass therein; and a reference surface which extends a bottom surface of said indentation in a direction perpendicular to the circumference of the bottom surface for transferring a glass gob reference surface to said molten glass, wherein said support member is used as a glass gob production device, and wherein said glass gob is reformed into an optical element by press-molding using said glass gob reference surface to position said glass gob.

7. A support member as claimed in claim 6 wherein said support member is formed of ceramic material, hard metal alloy, carbon or metal.

8. A glass gob production device for producing a glass gob from molten glass, said glass gob being reformed into an optical element by press-molding, comprising:

a crucible which accommodates the molten glass therein;

a nozzle with one end from which drops of the molten glass are discharged, and an other end of the nozzle having an internal diameter of 1 mm or less and an external diameter of 2 mm or greater but 15 mm or less; and a support member opposite to the other end of the nozzle for receiving and retaining the drops of the molten glass discharged from the nozzle to form a glass gob.

9. A glass gob production device as claimed in claim 8 further comprising:

a heating member which is provided around the crucible and the nozzle to heat the molten glass in the crucible and the nozzle at a predetermined temperature;

a detecting member which detects the timing at which a drop of the molten glass is discharged from the nozzle; and a controller which controls heating by the heating member based upon the detected timing.

10. A glass gob production device as claimed in claim 8 further comprising:

a moving member which lowers the support member at high speed so that the molten glass retained in the indentation of the support member is cut.

11. A glass gob production device as claimed in claim 8 wherein said support member is formed of ceramic material, hard metal alloy, carbon or metal.

12. A method for producing a glass gob reformed into an optical element by press-molding from molten glass comprising:

discharging the molten glass from a tip of a nozzle connected to a crucible which accommodates the molten glass therein;

receiving the discharged molten glass by means of a support member while forming a reference surface on the exterior surface of the received molten glass;

cutting the molten glass retained on the support member to form a glass gob when a predetermined amount of the molten glass is received on the support member; and press-molding said glass gob using said glass gob reference surface to position said glass gob.

13. A method as claimed in claim 12 wherein the receiving of the molten glass is performed in an indentation formed on the support member and having the reference surface at the side portion thereof, thereby the reference surface at the side portion of the indentation is transferred to the exterior surface of the molten glass received in the indentation of the support member.

14. A method as claimed in claim 12 wherein drops of the molten glass are discharged from the nozzle tip to be retained on the support member without separation from each other.

15. A method as claimed in claim 12 wherein the molten glass received on the support member is cut by lowering the support member at high speed.

16. A method as claimed in claim 12 wherein the receiving of the glass is performed while continuously lowering the support member.

17. A method as claimed in claim 12 wherein the receiving of the glass is performed while intermittently lowering the support member.

18. A method for producing a glass gob reformed into an optical element by press-molding from molten glass comprising:

discharging drops of the molten glass from a tip of a nozzle connected to a crucible which accommodates the molten glass therein;

receiving a reference surface on the exterior surface of the formed glass gob; and press-molding said glass gob using said glass gob reference surface to position said glass gob.

19. A method as claimed in claim 18 wherein the drops of the molten glass are retained on the support member without separation from each other.

20. A method as claimed in claim 18 further comprising the step:

cutting the drops of the molten glass received on the support member by lowering the support member at high speed.

21. A method for producing a glass gob reformed into an optical element by press-molding from molten glass comprising:

providing a crucible accommodating the molten glass and a nozzle connected to the crucible, tip of the nozzle having an internal diameter of 0.1 mm or greater but 1 mm or less and an external diameter of 2 mm greater but 15 mm or less;

discharging drops of the drops of the molten glass from the nozzle tip;

receiving the drops of the molten glass by means of a support member to retain thereon; and lowing the support member at high speed when a predetermined amount of the molten glass drops are retained on the support member, thereby cutting the molten glass retained on the support member to form a glass gob.

* * * * *